(12) United States Patent
Grell et al.

(10) Patent No.: US 9,809,189 B2
(45) Date of Patent: Nov. 7, 2017

(54) VEHICLE SIDE CURTAIN AIRBAG DEVICE HAVING FRONT PROTECTION FUNCTION

(71) Applicant: YANFENG KSS (SHANGHAI) AUTOMOTIVE SAFETY SYSTEMS CO., LTD., Shanghai (CN)

(72) Inventors: Benedikt Grell, Shanghai (CN); David Hampson, Shanghai (CN); Zhijia Wang, Shanghai (CN); Xiaoguang Zhu, Shanghai (CN); Paul Lincoln, Shanghai (CN)

(73) Assignee: YANFENG KSS (SHANGHAI) AUTOMOTIVE SAFETY SYSTEMS CO., LTD., Shanghai (CN)

( * ) Notice: Subject to any disclaimer, the term of this patent is extended or adjusted under 35 U.S.C. 154(b) by 0 days.

(21) Appl. No.: 15/022,598

(22) PCT Filed: May 6, 2014

(86) PCT No.: PCT/CN2014/076837
§ 371 (c)(1),
(2) Date: Mar. 17, 2016

(87) PCT Pub. No.: WO2015/039444
PCT Pub. Date: Mar. 26, 2015

(65) Prior Publication Data
US 2016/0229370 A1  Aug. 11, 2016

(30) Foreign Application Priority Data
Sep. 17, 2013  (CN) .......................... 2013 1 0425171

(51) Int. Cl.
*B60R 21/213* (2011.01)
*B60R 21/232* (2011.01)
(Continued)

(52) U.S. Cl.
CPC .......... *B60R 21/232* (2013.01); *B60R 21/213* (2013.01); *B60R 21/233* (2013.01);
(Continued)

(58) Field of Classification Search
CPC ........... B60R 2021/23107; B60R 2021/23161; B60R 2021/23308; B60R 2021/23386;
(Continued)

(56) References Cited

U.S. PATENT DOCUMENTS 3,795,412 A * 3/1974 John ....................... B60R 21/08
                                                         180/274
3,897,961 A * 8/1975 Leising ................. B60R 21/214
                                                         280/730.1
(Continued)

FOREIGN PATENT DOCUMENTS

CN       201961272 U      9/2011
CN       102371962 A      3/2012
(Continued)

OTHER PUBLICATIONS

International Search Report; dated Jul. 30, 2014; Thirteen (13) Pages.

*Primary Examiner* — Laura Freedman
(74) *Attorney, Agent, or Firm* — William H. Honaker; Dickinson Wright PLLC

(57) ABSTRACT

A vehicle side curtain airbag device having front protection function, comprising a side airbag (1) and an auxiliary airbag (2) connected to one side surface of the side airbag (1) and arranged in a left/right transverse direction after being expanded; a dividing hole membrane (3) is disposed between the side airbag (1) and the auxiliary airbag (2); the dividing hole membrane (3) is ensured to be opened only when the internal pressure of the side airbag (1) reaches a certain value, thus realizing self-adaptive opening threshold
(Continued)

adjustment, controlling the instant of inflation and inflation speed of the auxiliary airbag (2), and adjusting the stiffness of the auxiliary airbag (2). When a vehicle has a collision, the device protects the head and neck of a passenger in both side collision and front collision traffic accidents, thus effectively absorbing the collision impact energy of the passenger, and reducing injury to the passenger.

13 Claims, 8 Drawing Sheets

(51) Int. Cl.
| | | |
|---|---|---|
| B60R 21/233 | (2006.01) | |
| B60R 21/2338 | (2011.01) | |
| B60R 21/2342 | (2011.01) | |
| B60R 21/239 | (2006.01) | |
| B60R 21/2334 | (2011.01) | |
| B60R 21/00 | (2006.01) | |
| B60R 21/231 | (2011.01) | |

(52) U.S. Cl.
CPC ........ B60R 21/239 (2013.01); B60R 21/2334 (2013.01); B60R 21/2342 (2013.01); B60R 21/23138 (2013.01); B60R 2021/0004 (2013.01); B60R 2021/0032 (2013.01); B60R 2021/0048 (2013.01); B60R 2021/23107 (2013.01); B60R 2021/23161 (2013.01); B60R 2021/23308 (2013.01); B60R 2021/23386 (2013.01)

(58) Field of Classification Search
CPC ........ B60R 2021/26094; B60R 21/213; B60R 21/23138; B60R 21/232; B60R 21/233; B60R 21/2342; B60R 21/239
See application file for complete search history.

(56) References Cited

U.S. PATENT DOCUMENTS

| | | | | |
|---|---|---|---|---|
| 5,470,103 A | * | 11/1995 | Vaillancourt | B60R 21/214 280/730.1 |
| 5,486,019 A | * | 1/1996 | Chevroulet | B60R 21/164 180/271 |
| 5,575,497 A | * | 11/1996 | Suyama | B60R 21/231 280/730.1 |
| 6,073,960 A | * | 6/2000 | Viano | B60R 21/231 280/730.1 |
| 6,123,355 A | | 9/2000 | Sutherland | |
| 6,457,740 B1 | * | 10/2002 | Vaidyaraman | B60R 21/231 280/730.2 |
| 6,695,341 B2 | * | 2/2004 | Winarto | B60R 21/08 280/730.2 |
| 6,851,706 B2 | * | 2/2005 | Roberts | B60R 21/23138 280/730.1 |
| 7,350,804 B2 | * | 4/2008 | Bakhsh | B60R 21/232 280/730.2 |
| 7,549,672 B2 | * | 6/2009 | Sato | B60R 21/207 280/729 |
| 7,770,917 B2 | * | 8/2010 | Henderson | B60R 21/232 280/730.2 |
| 7,997,615 B2 | * | 8/2011 | Jang | B60R 21/231 280/730.1 |
| 8,636,301 B1 | * | 1/2014 | Wang | B60R 21/232 280/730.2 |
| 8,764,053 B1 | * | 7/2014 | Dix | B60R 21/203 280/729 |
| 8,882,139 B2 | * | 11/2014 | Kawamura | B60R 21/213 280/730.2 |
| 8,894,094 B2 | * | 11/2014 | Wang | B60R 21/232 280/730.2 |
| 8,899,617 B2 | * | 12/2014 | Fukawatase | B60R 21/232 280/730.2 |
| 8,967,660 B2 | * | 3/2015 | Taguchi | B60R 21/233 280/729 |
| 8,998,250 B2 | * | 4/2015 | Kruse | B60R 21/232 280/729 |
| 9,108,588 B2 | * | 8/2015 | Fukawatase | B60R 21/233 |
| 9,266,494 B2 | * | 2/2016 | Wang | B60R 21/237 |
| 9,539,978 B2 | * | 1/2017 | Mazanek | B60R 21/232 |
| 2009/0001695 A1 | * | 1/2009 | Suzuki | B60R 21/231 280/730.2 |
| 2013/0087995 A1 | * | 4/2013 | Lee | B60R 21/214 280/728.2 |
| 2014/0203541 A1 | * | 7/2014 | Wei | B60R 21/213 280/730.2 |

FOREIGN PATENT DOCUMENTS

| | | | | |
|---|---|---|---|---|
| CN | 103029673 A | | 4/2013 | |
| CN | 103448660 A | | 12/2013 | |
| CN | 203543883 U | | 4/2014 | |
| DE | WO 2004050435 A1 | * | 6/2004 | ........... B60R 21/214 |
| GB | 1450666 A | | 9/1976 | |
| SE | KR 20120093036 A | * | 8/2012 | |

* cited by examiner

VEHICLE SIDE CURTAIN AIRBAG DEVICE HAVING FRONT PROTECTION FUNCTION

CROSS REFERENCE TO RELATED APPLICATIONS

This application claims the benefit of PCT International Application Serial No. PCT/CN2014/076837 filed on May 6, 2014, which claims priority to Chinese Application Serial No. 201310425171.4 filed on Sep. 17, 2013. The entire disclosure of the above applications are incorporated by reference.

FIELD OF THE INVENTION

The present invention relates to vehicle airbags, and more particularly to a vehicle side curtain airbag device with front protection function.

BACKGROUND OF THE INVENTION

At present, components and parts in conventional motor vehicle passive safety systems are used to mainly protect passengers in front seats. Besides safety belts, these components and parts include front airbags and side airbags. Generally, the front airbags and side airbags are inflated by gas generators to protect passengers. The as generators are ignited under the control of main control units, which presents good results and saves thousands of lives. Moreover, for protecting passengers in rear seats, most motor vehicles are equipped only with safety belts. However, safety belts can restrain the rear passengers' bodies, but they cannot protect the rear passengers' head and neck, so the rear passengers' head and neck are often injured by excessive stretching.

According to CNCAP Crash Test 2012 edition, that is, new car assessment program on rear passenger injuries 2012 edition, in a total of eighteen kinds of tested vehicles, only two kinds of vehicles get full marks for protecting rear passengers' heads and necks in frontal impact test against rigid barrier, with 100% overlapping at 50 km/h and frontal impact test against deformable barrier with 40% overlapping at 64 km/h. Even some CNCAP five-star vehicles scores 0 in protecting rear passengers' heads and necks.

According to 2012 Insurance Institute for Highway Safety (IIHS) 25% rigid barrier offset impact test results, most of vehicles cannot reach the level of excellence in the evaluation of occupant restraint because occupants' heads slide out of drivers' airbag protection range.

SUMMARY OF THE INVENTION

An object of the present invention is to overcome the foregoing problems and dispose a transverse additional airbag on a side airbag to protect a passenger' head and neck effectively.

To achieve the above-mentioned object, a vehicle side curtain airbag device having front protective function in accordance with the present invention is provided. The vehicle side curtain airbag device includes a side airbag, wherein one side face of the side airbag is connected to an end face of an additional airbag which is in a left-right transverse arrangement after being inflated.

The additional airbag has an inflation inlet defined outside an end face of the additional airbag; or an inflation hole is formed through an end face of the additional airbag and the side airbag; or a connecting portion between an end face of the additional airbag and the side airbag is formed integrally and a diffluence hole membrane is formed on an end face of the additional airbag, wherein a periphery of the diffluence hole membrane is surrounded by that of the end face of the additional airbag.

The additional airbag has no vent hole or at least one vent hole defined therein. The additional airbag is located in front of an area where a passenger in a seat sits.

An outer contour of the additional airbag is generally a transverse cylinder after the additional airbag is inflated; or the outer contour of the additional airbag is generally a triangular body in the shape of sandwich after the additional airbag is inflated; or the outer contour of the additional airbag has a generally wedge-shaped cross-section after the additional airbag is inflated.

When the outer contour of the inflated additional airbag has a generally wedge-shaped cross-section, an angle between an inflation direction of the inflated additional airbag and a longitudinal direction (i.e. the front-rear direction) of a vehicle body is between 45 degrees and 90 degrees.

A free end of the additional airbag is connected to one end of as bulling strap, and the other end of the pulling strap is fixed on a vehicle body ceiling.

At least one additional airbag is connected to the side airbag.

The diffluence hole membrane has a plurality of seam lines sewn thereon, which are for tearing and parallel to each other, an outer profile defined by the plurality of seam lines has a geometric shape, and the diffluence hole membrane with the plurality of seam lines is stacked or folded.

Comparing with the prior state of the art, the present invention provides not only protection for passengers' heads and necks in side collisions, but also protection for front and rear passengers' heads and necks in frontal collisions. Further, the present invention may dispose the diffluence hole membrane between the side airbag and the additional airbag and ensure that the diffluence hole membrane isn't broken through until an internal pressure of the side airbag reaches a certain value, thus the present invention can achieve adaptive adjustment of the opening threshold, control the point in time, the length of time and the rate for charging the additional airbag, and adjust the stiffness of the additional airbag, which ensures that the present invention can absorb impact energy that is applied to passengers more effectively and further reduce damage to passengers.

DETAILED DESCRIPTION OF THE PREFERRED EMBODIMENTS

Below the present invention is described in detail on the basis of the accompanying drawings and embodiments.

The present invention provides a vehicle side curtain airbag device which can provide a front protection for passengers, or "vehicle side curtain airbag device" for short in the embodiment. The vehicle side curtain airbag device has an airbag portion which mainly includes a side airbag and an additional airbag. Like conventional vehicle side curtain airbag devices, the vehicle side curtain airbag device of the present invention may be fixed between one side of a vehicle body ceiling 7 and a vehicle body interior ceiling, and the side airbag 1 is long enough to cover passengers from a first row to a last row. A gas generator for inflating the side airbag 1 and the additional airbag 2 is fixed between the vehicle body ceiling 7 and the vehicle body interior ceiling. According to the requirement of internal pressure of the side airbag 1, one or more than one gas generators may be disposed. A main control unit for the vehicle side curtain airbag device may be installed in a vehicle body center tunnel, close to front passengers. The main control unit includes a plurality of sensors arranged around the vehicle body to detect side or frontal impact, thereby ensuring that the side airbag and the additional airbag are inflated in time.

A major characteristic of the present invention is that one side of the side airbag 1, that is the user side of the side airbag 1, is connected to one end face of the additional airbag 2 which is in a left-right transverse arrangement after being inflated, and at least one additional airbag 2 is connected to the side airbag 1, wherein the number or the transverse length of the additional airbags 2 is determined by the passenger-capacity of the vehicle.

Figure 1:
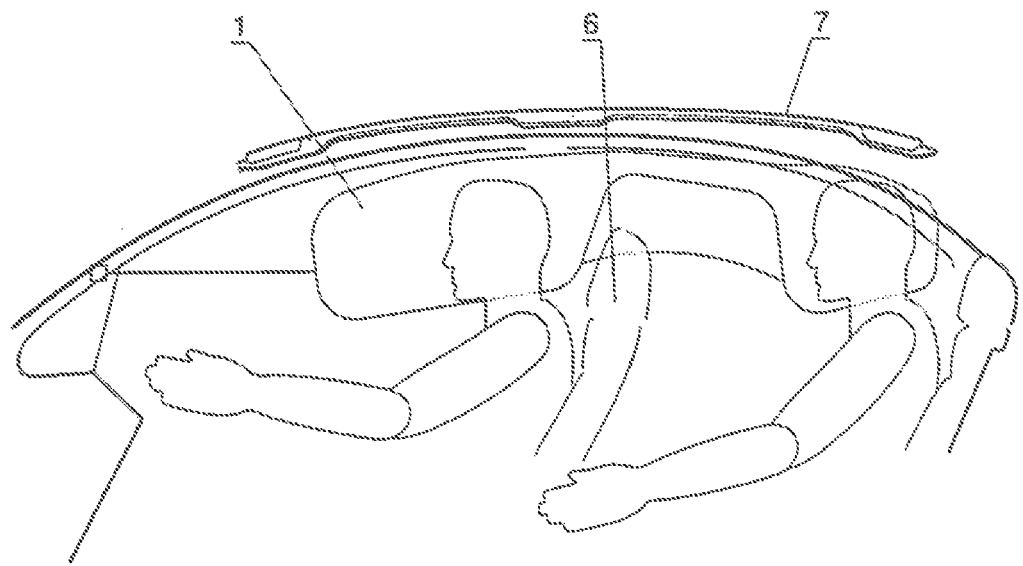
FIG. 1 is a work schematic view of a conventional side curtain, after being inflated.
Figure 2:
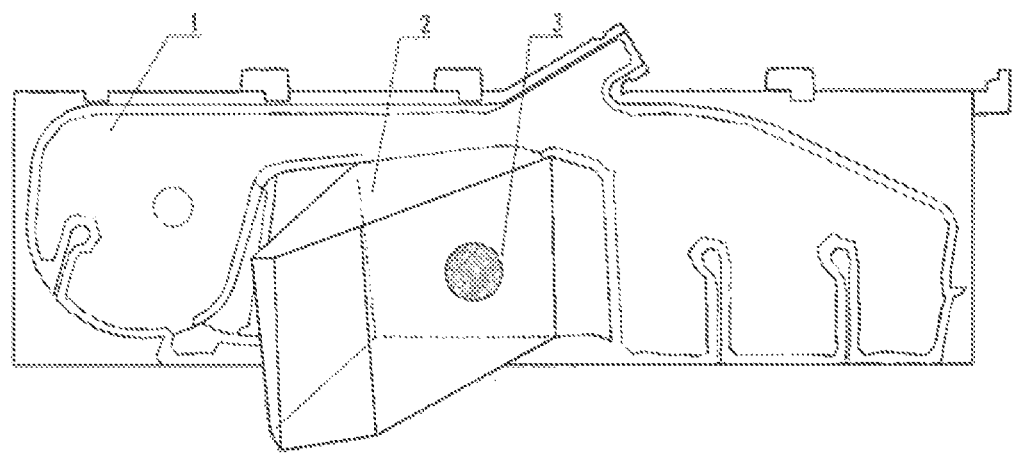
FIG. 2 is a work schematic view of an additional airbag with a diffluence hole membrane and a side airbag according to an embodiment of the present invention, after being inflated.
Figure 3:
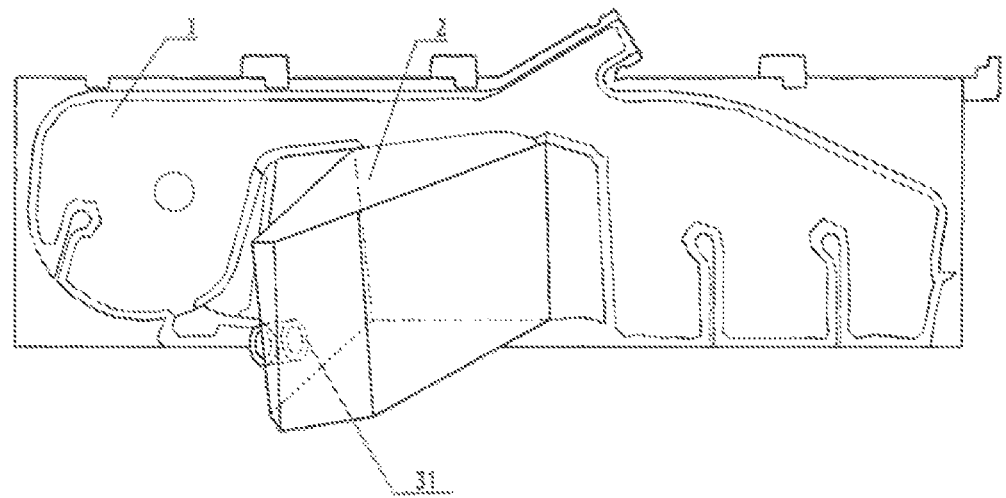
FIG. 3 is a work schematic view of an additional airbag with an inflation inlet and a side airbag according to an embodiment of the present invention, after being inflated.
Figure 4:
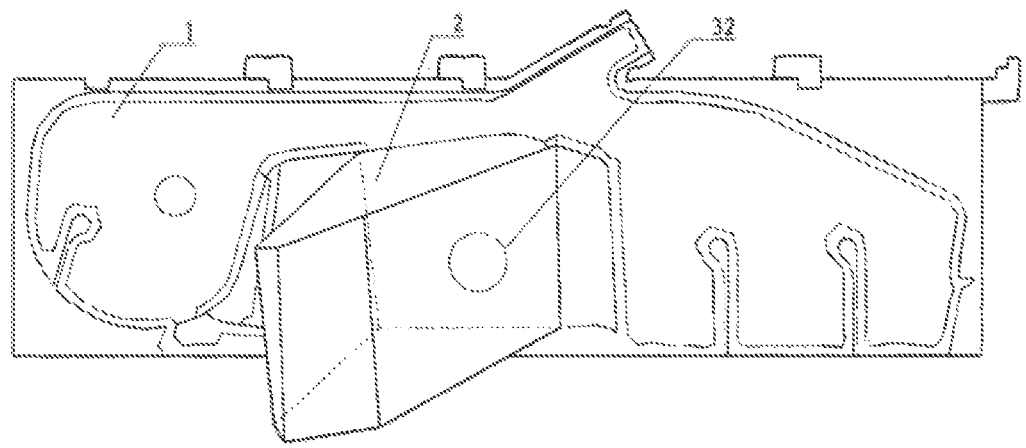
FIG. 4 is a work schematic view of an additional airbag with an inflation hole and a side airbag according to an embodiment of the present invention, after being inflated.

The additional airbag 2 may have an inflation inlet 31 defined outside an end face thereof, as shown in FIG. 3, so that when a collision occurs, the main control unit may inflate only the side airbag 1 or both the side airbag 1 and the additional airbag 2 through two paths according to the impact force. Alternatively, an inflation hole 32 is formed through an end face of the additional airbag 2 and the side airbag 1, as shown in FIG. 4, so that when a collision occurs, the additional airbag 2 and the side airbag 1 may be inflated at the same time. In another embodiment, a connecting portion between an end face of the additional airbag 2 and the side airbag 1 is formed integrally and a diffluence hole membrane 3 is formed on an end face of the additional airbag 2, a periphery of the diffluence hole membrane 3 surrounded by that of the end face of the additional airbag as shown in FIG. 2. A plurality of seam lines, parallel to each other, are sewn on the diffluence hole membrane 3 and used for tearing. An outer profile defined by the plurality of seam lines has a geometric shape. The diffluence hole membrane 3 with the plurality of seam lines is stacked or folded. In this way, the main control unit of the vehicle side curtain airbag device can control the rate of inflation at which the gas generator inflates the side airbag and the volume of inflated gas according to the impact force so as to ensure that the diffluence hole membrane 3 isn't broken through and the additional airbag 2 doesn't work, or the diffluence hole membrane 3 is broken through and the side airbag 1 and the additional airbag 2 are inflated one after another.

Figure 8:
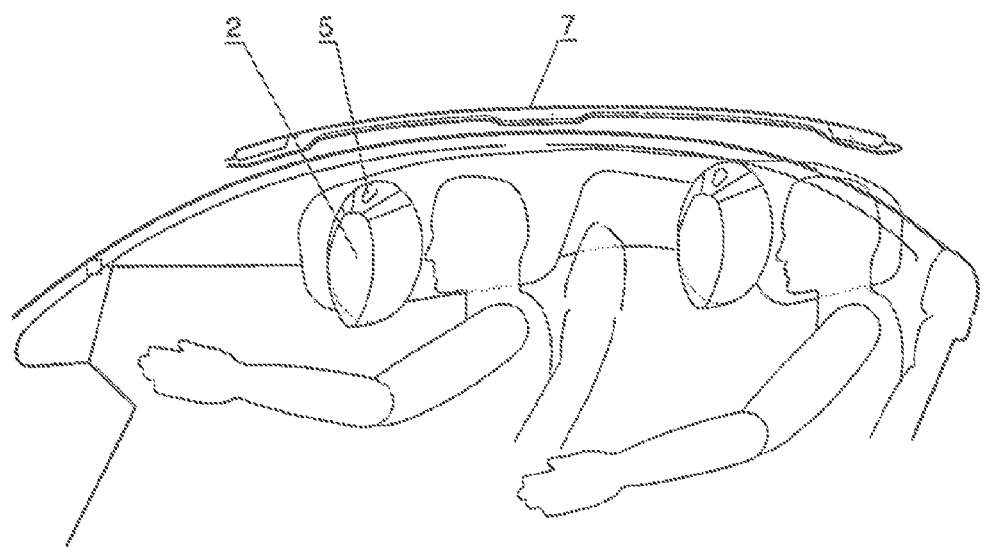
FIG. 8 is a side view of sandwich-shaped additional airbags according to an embodiment of the present invention, in a work state.
Figure 9:
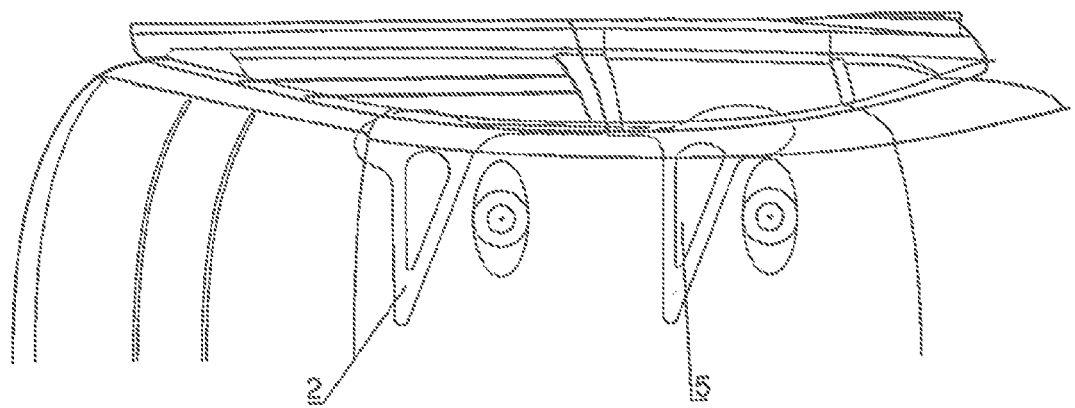
FIG. 9 is a top view of the sandwich-shaped additional airbags according to an embodiment of the present invention, in the work state.

The additional airbag 2 may have no hollow through-hole or at least one hollow through-hole 5 defined therein. When there is one hollow through-hole 5 defined in the additional airbag 2, the additional airbag 2 is ring shaped. The cross section of the through-hole 5 may be triangular, circular and so on. The through-hole 5 may be arranged up-down vertically; alternatively, the through-hole 5 may also be arranged left-right horizontally, as shown in FIG. 8 and FIG. 9.

The additional airbag 2 is located in front of the area where a passenger in the seat 6 stays.

In one embodiment, an outer contour of the additional airbag 2 is generally a transverse cylinder after the additional airbag 2 is inflated. In another embodiment, the outer contour of the additional airbag 2 is generally a triangular body in the shape of sandwich after the additional airbag 2 is inflated. In another embodiment, the outer contour of the additional airbag 2 has a generally wedge-shaped cross-section after the additional airbag 2 is inflated.

When the outer contour of the inflated additional airbag 2 has a generally wedge-shaped cross-section, the angle between the inflation direction of the additional airbag 2 and the longitudinal direction of the vehicle body is between 45 degrees and 90 degrees, and in general, the angle can be 45 degrees or 60 degrees. A free end of the additional airbag 2 may be connected to one end of a pulling strap 4, and the other end of the pulling strap 4 is fixed on the vehicle body ceiling 7.

Embodiment 1

Please refer to FIG. 2, in the first embodiment, the connecting portion between an end face of the additional airbag 2 and the side airbag 1 is formed integrally, that is the end face of the additional airbag 2 and the side airbag 1 share as layer of fabric at the connecting potion, and a diffluence hole membrane 3 is formed on an end face of the additional airbag 2. Once a collision occurs, sensors around the vehicle body will transmit an impact force to the main control unit of the vehicle side curtain airbag device firstly. Then the main control unit controls the rate and the time of the gas generator inflating the side airbag based on the impact force, if the impact force is less than a given value of impact three for opening the additional airbag 2, then the main control unit will control the gas generator to charge a certain amount of gas into the side airbag 1 and the side airbag 1 will expand downwards along interiors on the side of the vehicle body, but the charged gas cannot provide enough pressure for breaking through the diffluence hole membrane 3. If the impact force reaches the given value of impact force liar opening the additional airbag 2, then the main control unit will control the gas generator to charge enough gas into the side airbag 1 till the seam lines on the diffluence hole membrane 3 tears. At this time, the gas enters the additional airbag 2 so that the additional airbag 2 expands transversely. In the embodiment, the angle between the expansion direction of the additional airbag 2 and that of the side airbag 1 is about 90 degrees.

The diffluence hole membrane 3 can be regarded as an adaptive vent. When the pressure on the diffluence hole membrane 3 reaches an open value, the diffluence hole membrane 3 will be broken through. The main control unit can control the point in time, the length of time and the rate for charging the additional airbag 2 based on the impact force to adjust the stiffness of the additional airbag 2, thereby more effectively absorbing impact energy that is applied to passengers and further reducing damage to passengers.

Please refer to FIGS. 12-15, FIGS. 12-15 show the simulation of damage to passengers' heads and necks when frontal impact of vehicles occurs, wherein the vehicles are equipped with the airbag portion of the embodiment of the present invention which mainly includes the side airbag and the additional airbag. In FIGS. 12-15, black solid lines indicate simulation curves of damage to passengers' heads and necks during frontal impact when conventional side curtains are applied in vehicles; and black broken lines indicate simulation curves of damage to passengers' heads and necks during frontal impact when the present invention is applied in vehicles. Comparing and analyzing the simulation results, it can be seen that the present invention can effectively absorb the impact energy in impact accidents and provide effective protection for front and rear passengers' heads and necks.

Embodiment 2

Figure 5:
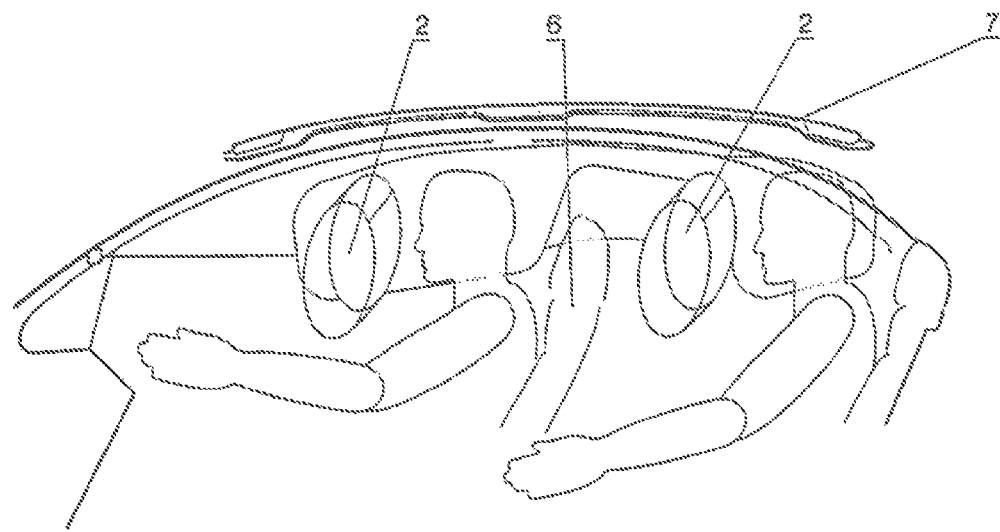
FIG. 5 is a work schematic view of a side airbag connected with two additional airbags according to an embodiment of the present invention.

Please refer to FIG. 5, the number of the additional airbags 2 connected to the side airbag 1 may be determined by the number of seats 6 in a vehicle. In the second embodiment, two additional airbags 2 in a front-rear arrangement are disposed on one side of the side airbag 1. After being inflated, the two additional airbags 2 are located in front of front and rear passengers' heads, respectively. Each of the two inflated additional airbags 2 is shaped like a transverse cylinder of which the cross-section is oval. Once frontal impact occurs, the front and rear additional airbags 2 start to be inflated immediately after the side airbag 1 is inflated, and the inflated additional airbags 2 are located in front of the passengers' heads to protect their heads and necks. Taking younger passengers into consideration, the longitudinal length of the additional airbags 2 is prolonged appropriately. The front and rear additional airbags 2 can protect passengers not only in frontal impact accidents but also in angled offset impact accidents, for example, IIHS 25% rigid barrier offset impact test.

Embodiment 3

Figure 6:
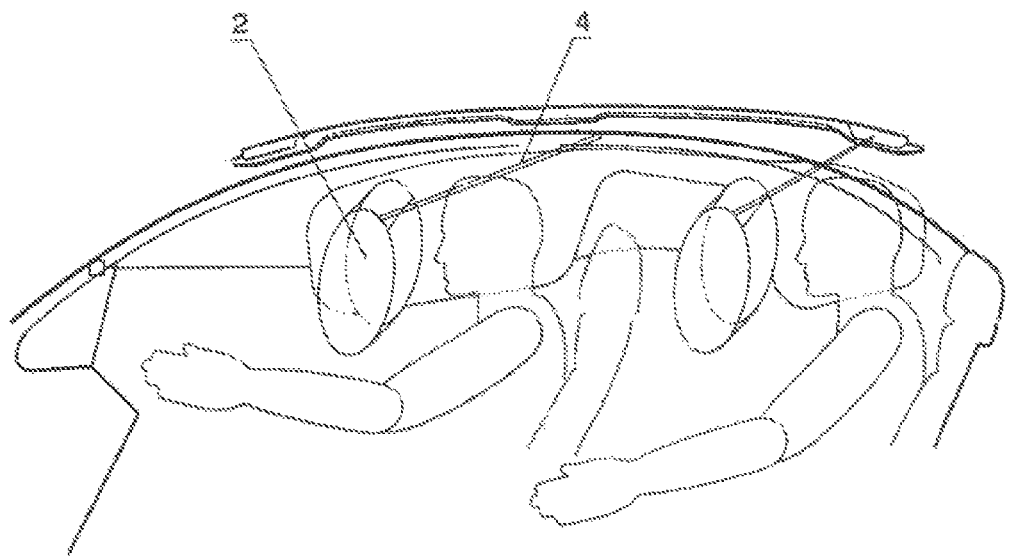
FIG. 6 is a side view of additional airbags with pulling straps according to an embodiment of the present invention, in a work state.
Figure 7:
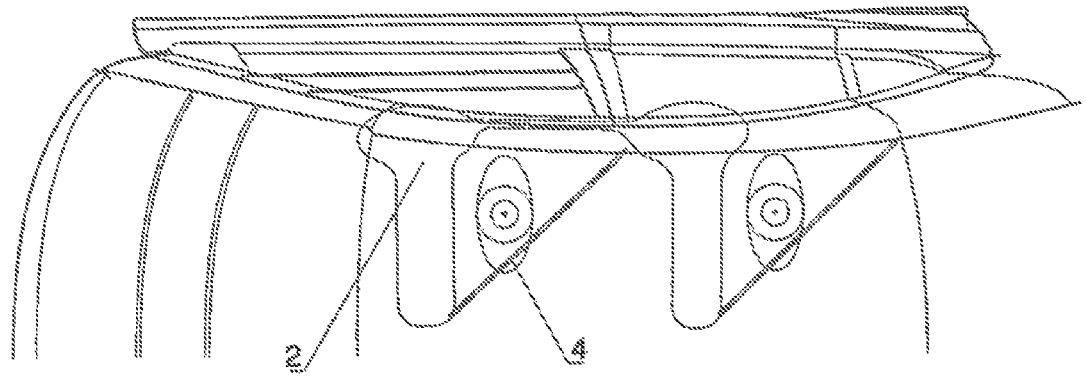
FIG. 7 is a top view of the additional airbags with pulling straps according to an embodiment of the present invention, in the work state.

Please refer to FIG. 6 and FIG. 7, the third embodiment is further improved on the basis of the second embodiment, that is, for providing enough support for avoiding that the additional airbags 2 move away from passengers, each of the two additional airbags 2 has a pulling strap 4 disposed thereon, of which one end is fastened on the is end of the corresponding additional airbag 2 and the other end is fixed between the vehicle body ceiling 7 and the interior ceiling. The constraining force of the additional airbags 2 can be optimized by adjusting the lengths of the pulling straps so as to reduce the acceleration of passengers' heads, thereby keeping passengers' heads from contacting with the seats 6 and/or an instrument panel and reducing neck injury risks.

Embodiment 4

Please refer to FIG. 8 and FIG. 9, in the fourth embodiment, after being inflated, each additional airbag 2 has an outer contour of a triangular body which is generally in the shape of sandwich, and a triangular through-hole 5 is defined in a longitudinal direction in the middle of each additional airbag 2. Alternatively, the through-hole may also be a circular hole so that the middle portion of the additional airbag 2 is hollow, so the additional airbag 2 provides not only an enough constraining force for passengers' heads, but also a certain buffer effect to avoid that the constraining force is too large to bring passengers' heads and necks a secondary damage.

Embodiment 5

Figure 10:
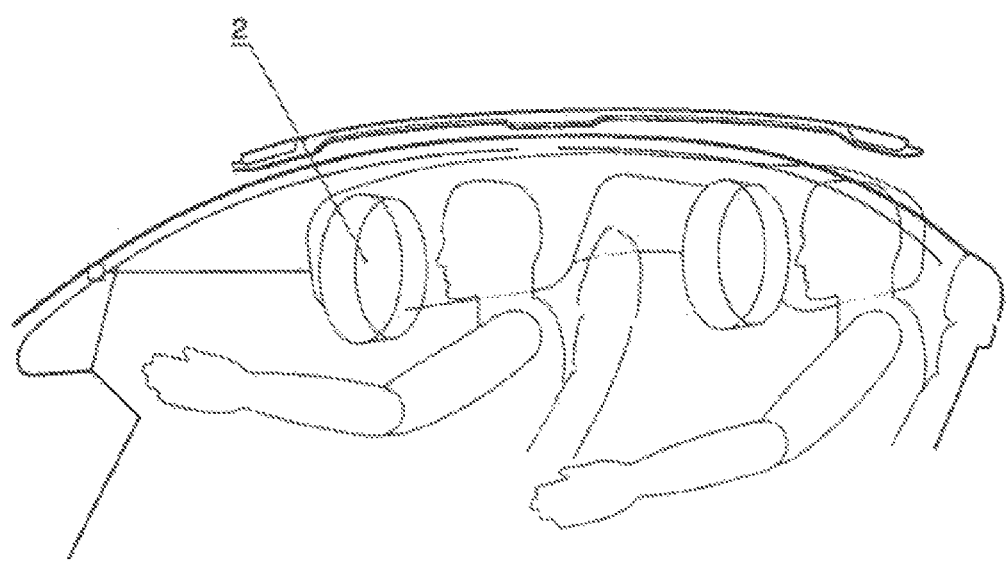
FIG. 10 is a side view of wedge-shaped additional airbags according to an embodiment of the present invention, in a work state.
Figure 11:
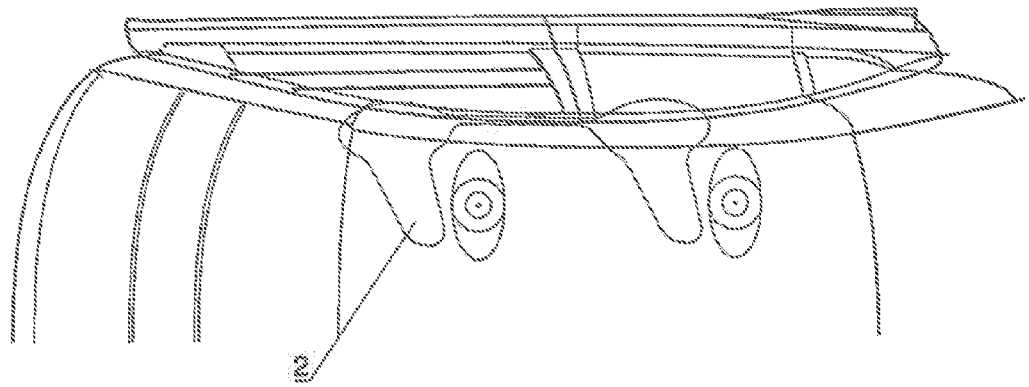
FIG. 11 is a top view of the wedge-shaped additional airbags according to an embodiment of the present invention, in the work state.
Figure 12:
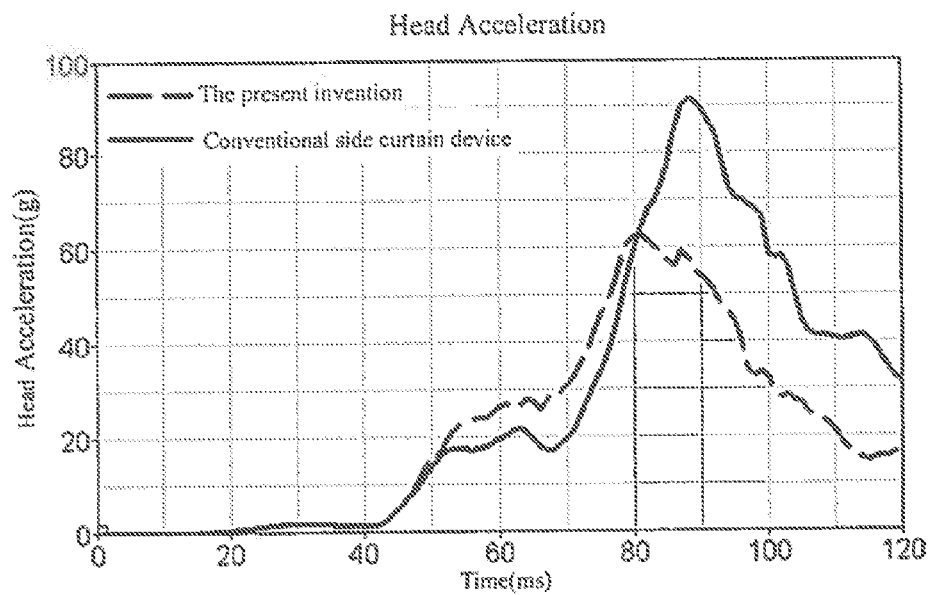
FIG. 12 is a curve diagram of passengers' head acceleration after a frontal impact, wherein a vehicle side curtain airbag device of a first embodiment of the present invention and a conventional side curtain airbag device are respectively used.
Figure 13:
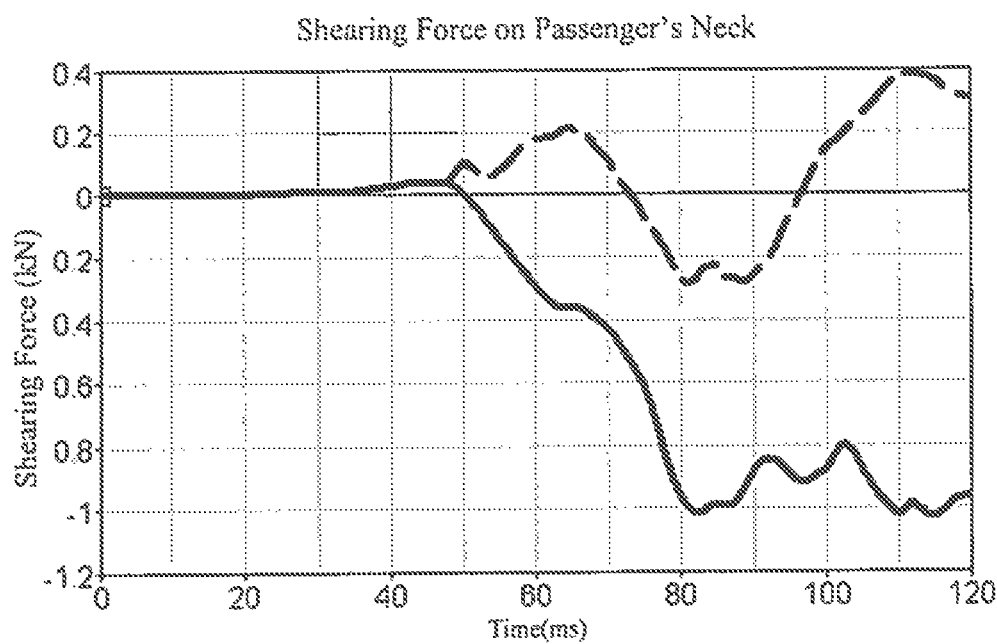
FIG. 13 is a curve diagram of shearing forces on passengers' necks of a frontal impact, wherein the vehicle side curtain airbag device of the first embodiment of the present invention and a conventional side curtain airbag device are respectively used.
Figure 14:
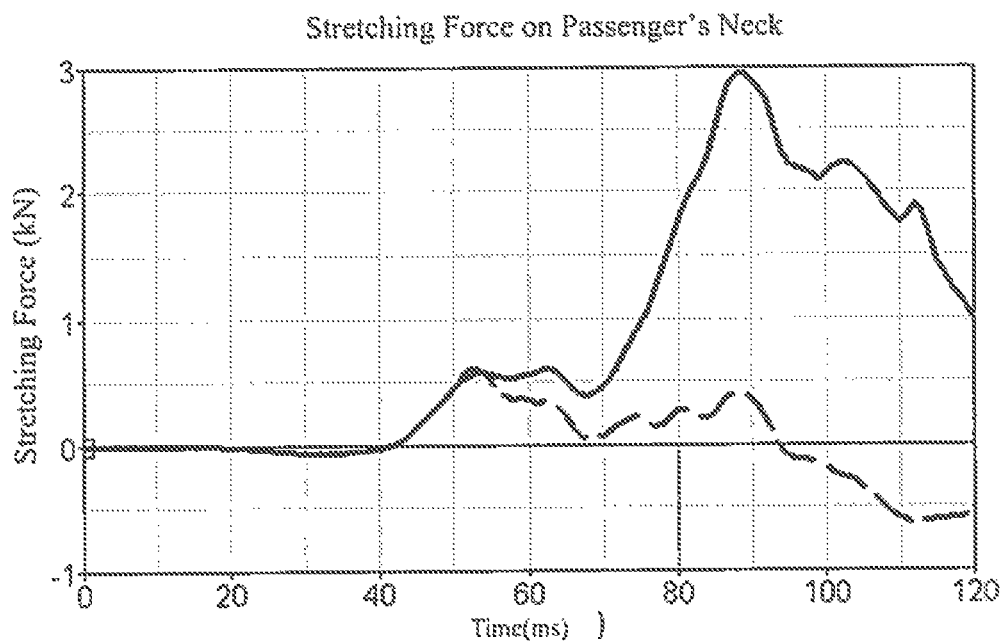
FIG. 14 is a curve diagram of stretching forces on passengers' necks of a frontal impact, wherein the vehicle side curtain airbag device of the first embodiment of the present invention and a conventional side curtain airbag device are respectively used.
Figure 15:
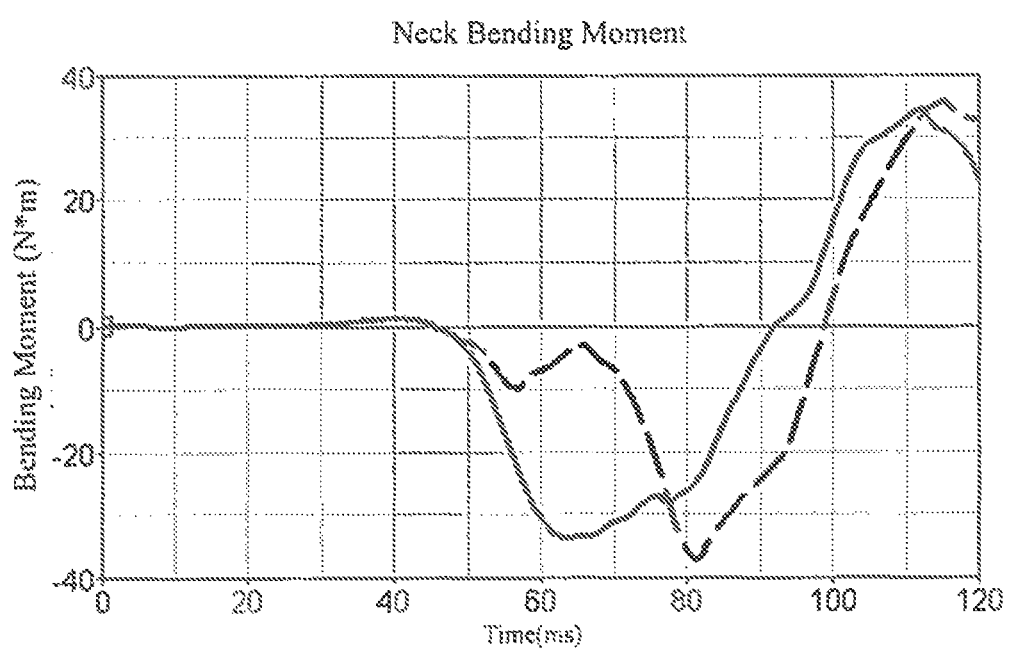
FIG. 15 is a curve diagram of neck bending moments after a frontal impact, wherein the vehicle side curtain airbag device of the first embodiment of the present invention and a conventional side curtain airbag device are respectively used.

Please refer to FIG. 10 and FIG. 11 the fifth embodiment also has two additional airbags 2 in a front-rear arrangement, After being inflated, each additional airbag 2 generally has an outer contour with a wedge-shaped horizontal cross-section, and the angle between the inflation direction of each additional airbag 2 and the longitudinal direction of the vehicle body is between 45 degrees and 90 degrees, and in general, the angle can be 45 degrees or 60 degrees, so that the free end of the additional airbag 2 inclines to the passenger side. The expansion shape of the additional airbags 2 can help increase the constraining force for passengers in the front-rear direction of the vehicle body and reduce the forwards movement of passengers' heads, thereby reducing neck injuries.

What is claimed is:
1. A vehicle side curtain airbag device having frontal protective function, comprising a side airbag, wherein one side face of the side airbag (1) is connected to an end face of an additional airbag (2) which is in a left-right transverse arrangement after being inflated, wherein a connecting portion between the end face of the additional airbag (2) and the side airbag (1) share a layer of fabric and a diffluence hole membrane (3) is formed on the end face of the additional airbag (2), wherein a periphery of the diffluence hole membrane (3) is surrounded by that of the end face of the additional airbag (2), and wherein the diffluence hole membrane (3) has a plurality of seam lines sewn thereon, which are parallel to each other and configured to tear in response to a predetermined pressure in the side airbag (1), an outer profile defined by the plurality of seam lines has a geometric shape, and the diffluence hole membrane (3) is stacked or folded; and if an impact force of a collision is less than a given value for opening the additional airbag (2), a gas generator charges gas into the side airbag (1) which expands downwards; if an impact force of a collision reaches the given value for opening the additional airbag (2), the gas generator charges enough gas into the side airbag (1) until the seam lines on the diffluence hole membrane (3) tear, then the gas enters into the additional airbag (2) which expands transversely.

2. The vehicle side curtain airbag device having frontal protective function as claimed in claim 1, wherein the additional airbag (2) has no hollow through-hole or at least one hollow through-hole (5) defined therein.

3. The vehicle side curtain airbag device having front protection function as claimed in claim 2, wherein the additional airbag (2) is located in front of a seat (6).

4. The vehicle side curtain airbag device having front protection function as claimed in claim 2, wherein an outer contour of the additional airbag (2) is generally a transverse cylinder after the additional airbag (2) is inflated; or the outer contour of the additional airbag (2) is generally a triangular body in the shape of sandwich after the additional airbag (2) is inflated; or the outer contour of the additional airbag (2) has a generally wedge-shaped cross-section after the additional airbag (2) is inflated.

5. The vehicle side curtain airbag device having front protection function as claimed in claim 4, wherein the outer contour of the inflated additional airbag has the generally wedge-shaped cross-section, and an angle between an inflation direction of the inflated additional airbag and a longitudinal direction of a vehicle body is between 45 degrees and 90 degrees.

6. The vehicle side curtain airbag device having front protection function as claimed in claim 2, wherein a free end of the additional airbag (2) is connected to one end of a pulling strap (4), and the other end of the pulling strap (4) is fixed on a vehicle body ceiling (7).

7. The vehicle side curtain airbag device having frontal protective function as claimed in claim 1, wherein the additional airbag (2) is located in front of a seat (6).

8. The vehicle side curtain airbag device having frontal protective function as claimed in claim 1, wherein an outer contour of the additional airbag (2) is generally a transverse cylinder after the additional airbag (2) is inflated; or the outer contour of the additional airbag (2) is generally a triangular body in the shape of sandwich after the additional airbag (2) is inflated; or the outer contour of the additional airbag (2) has a generally wedge-shaped cross-section after the additional airbag (2) is inflated.

9. The vehicle side curtain airbag device having frontal protective function as claimed in claim 8, wherein the outer contour of the inflated additional airbag has the generally wedge-shaped cross-section, and an angle between an inflation direction of the inflated additional airbag and a longitudinal direction of a vehicle body is between 45 degrees and 90 degrees.

10. The vehicle side curtain airbag device having frontal protective function as claimed in claim 1, wherein a free end of the additional airbag (2) is connected to one end of a pulling strap (4), and the other end of the pulling strap (4) is fixed on a vehicle body ceiling (7).

11. The vehicle side curtain airbag device having frontal protective function as claimed in claim 1, wherein at least another additional airbag (2) is connected to the side airbag (1).

12. The vehicle side curtain airbag device having front protection function as claimed in claim 1, further including a control unit electrically connected to the gas generator for controlling how much gas is charged into the side airbag (1); the control unit including a plurality of sensors configured to detect an impact force; and the control unit configured to charge enough gas into the side airbag (1) until the seam lines on the diffluence hole membrane (3) tear in the event that the sensors detect that the impact force of a collision reaches a given value.

13. The vehicle side curtain airbag device having front protection function as claimed in claim 12, wherein the control unit is configured to control the gas generator to charge a predetermined amount of gas into the side airbag (1) to expand the side airbag (1) to a predetermined gas pressure that does not tear the seam lines of the diffluence hole membrane (3) in the event that the sensors detect that the impact force of a collision is less than the given value.

\* \* \* \* \*